United States Patent [19]

Ishibashi et al.

[11] 4,268,312
[45] May 19, 1981

[54] OPTICAL GLASS

[75] Inventors: Kazufumi Ishibashi, Sagamihara; Takeo Ichimura, Tokyo, both of Japan

[73] Assignee: Nippon Kogaku K.K., Tokyo, Japan

[21] Appl. No.: 82,883

[22] Filed: Oct. 9, 1979

[30] Foreign Application Priority Data

Oct. 24, 1978 [JP] Japan ................................. 53-129972

[51] Int. Cl.³ ................................................ C03C 3/14
[52] U.S. Cl. .................................................... 106/47 Q
[58] Field of Search ........................... 106/47 Q, 54, 53

[56] References Cited

U.S. PATENT DOCUMENTS

| | | | |
|---|---|---|---|
| 3,958,999 | 5/1976 | Izumitani et al. | 106/47 Q |
| 4,118,238 | 10/1978 | Ishibashi et al. | 106/47 Q |
| 4,119,471 | 10/1978 | Komorita et al. | 106/47 Q |
| 4,120,732 | 10/1978 | Komorita et al. | 106/47 Q |
| 4,144,076 | 3/1979 | Matsumara | 106/47 Q |
| 4,166,746 | 9/1979 | Ishibashi et al. | 106/47 Q |

*Primary Examiner*—O. R. Vertiz
*Assistant Examiner*—Mark Bell
*Attorney, Agent, or Firm*—Shapiro and Shapiro

[57] ABSTRACT

An optical glass composition having high refractive index and low dispersion is disclosed which is characterized in that it contains no harmful thorium compound and instead contains $WO_3$ in a content of 10 to 35 percent by weight introduced into the system of $B_2O_3$-$La_2O_3$-$ZrO_2$-$Ta_2O_5$. The optical glass herein disclosed has a high refractive index (nd) ranging from 1.85 to 1.97 and a low Abbe's number ($\nu$d) ranging from 28 to 38. Also, the optical glass is stable against devitrification and excellent in chemical durability.

9 Claims, No Drawings

OPTICAL GLASS

BACKGROUND OF THE INVENTION

1. Field of the Invention

The present invention relates to optical glass composition having high refractive index and low dispersion.

2. Description of the Prior Art

Many known glass compositions of high refractive index and low dispersion contain an amount of thorium oxide to give to the glass compositions the desired properties of high refractive index and low dispersion. But, thorium is radioactive and harmful to the human body. Therefore, the use of a thorium compound as an ingredient of a glass composition must be avoided.

An example of a high refractive index and low dispersion glass composition containing no thorium oxide is disclosed in U.S. Pat. No. 3,080,240 (Japanese Patent Publication No. 2936/1961). This known glass composition is of the system of $B_2O_3$-$La_2O_3$-$ZrO_2$-$Ta_2O_5$ and its optical constants are 1.747 to 1.873 in refractive index (nd) and 40.0 to 52.8 in Abbe number ($\nu$d). However, this glass composition has some drawbacks. It is unstable against devitrification because of its high liquid phase temperature and it is unsuitable for industrial scale mass production. Furthermore, its refractive index (nd), the upper limit of which is 1.873, is not satisfactorily high.

SUMMARY OF THE INVENTION

Accordingly, it is an object of the invention to provide an optical glass composition which contains no thorium compound but has a high refractive index (nd) in the range of from 1.85 to 1.97 and a low Abbe number ($\nu$d) in the range of 28 to 38.

It is another object of the invention to provide an optical glass composition which is stable against devitrification and which has an improved chemical durability and a practically optimum light transmission factor.

Other and further objects, features and advantages of the invention will appear more fully from the following description of embodiments.

DESCRIPTION OF THE PREFERRED EMBODIMENTS

According to the invention, to attain the above objects, there is introduced in the quaternary system of $B_2O_3$-$La_2O_3$-$ZrO_2$-$Ta_2O_5$ a particularly predetermined amount of $WO_3$ which lowers the liquid phase temperature of the optical glass composition and renders to it stakes against devitrification. Since $WO_3$ also has the effect of raising the refractive index of glass, the five component system glass composition according to the invention has a higher upper limit of refractive index as compared with the above described known quaternary system glass composition. In addition, since $WO_3$ improves the chemical durability of glass, the glass composition of the invention has a higher chemical durability.

The glass composition according to the invention may contain, in addition to the above five essential ingredients, other ingredients such as $SiO_2$, ZnO, alkaline earth metal oxide, $Al_2O_3$, $GeO_2$, PbO, $TiO_2$ and $Nb_2O_5$. Among these optional ingredients, $SiO_2$ and $GeO_2$ improve stability against devitrification, and PbO, $TiO_2$ and $Nb_2O_5$ raise the refractive index (nd) of the glass composition. ZnO and alkaline earth metal oxide are useful for lowering the viscosity of a molten glass mass which in turn makes defoaming easy. $Al_2O_3$ further improves the chemical durability. These additional ingredients may be added when it is desired.

In summary, the glass composition of the present invention comprises the following components (contents in percent by weight):

| | |
|---|---|
| $B_2O_3$ | 6–21 |
| $La_2O_3$ | 27–50 |
| $ZrO_2$ | 1–9 |
| $Ta_2O_5$ | 1–31 |
| $WO_3$ | 10–35 |
| $SiO_2$ | 0–11 |
| ZnO | 0–3 |
| Alkaline earth metal oxide | 0–9 |
| $Al_2O_3$ | 0–5 |
| $GeO_2$ | 0–11 |
| PbO | 0–8 |
| $TiO_2$ | 0–11 |
| $Nb_2O_5$ | 0–4 |

When the content of $B_2O_3$ is less than 6 percent, there is produced a glass composition which is unstable against devitrification. On the other hand, the use of $B_2O_3$ of more than 21 percent results in a reduction of refractive index (nd) to such an extent that the object of the invention can not be attained.

When the content of $La_2O_3$ is lower than 27 percent, the molten mass has a tendency to separate into two phases. But, if it is over 50 percent, the glass obtained is unstable against devitrification.

A $ZrO_2$ content of less than 1 percent makes the glass unstable against devitrification. If it exceeds 9 percent, then $ZrO_2$ remains partially unmelted in the molten mass and therefore a longer time is required to melt the glass mass completely.

Use of $Ta_2O_5$ in an amount under 1 percent or over 31 percent produces a glass composition which is unstable against devitrification.

When the content of $WO_3$ is less than 10 percent, the glass composition is unstable against devitrification and when it is over 35 percent the molten mass is apt to separate into two phases.

The content of $SiO_2$, if used, should not exceed 11 percent. Otherwise, a portion of the added $SiO_2$ remains unmelted and therefore a long time is required to completely melt the mass. The use of ZnO in an amount over 3 percent makes the glass composition unstable against devitrification. Also, the use of an alkaline earth metal oxide in an amount over 9 percent makes the glass composition unstable against devitrification. Addition of $Al_2O_3$ over 5 percent produces a glass composition which is not stable against devitrification. A content of PbO over 8 percent also produces a glass composition which is not stable against devitrification.

The addition of $TiO_2$ of more than 11 percent produces a glass composition the Abbe number of which is too small to be suitable for the purposes of the invention. Use of $Nb_2O_5$ in an amount over 4 percent produces a glass composition which is not stable against devitrification. The addition of $GeO_2$ of more than 11 percent makes the glass composition too expensive to be practically useful. When the sum of $Ta_2O_5$ and $WO_3$ is in the range of 27 to 57 percent, there is obtained a glass composition which is more stable against devitrification.

By omitting PbO, $TiO_2$ and $Nb_2O_5$ from the above composition there is produced a less colored glass composition. $GeO_2$ may be omitted without losing stability against devitrification. Since $GeO_2$ is very expensive, omission of it reduces the manufacturing cost of the glass composition.

In the above described ranges, those glass compositions in which the content of alkaline earth metal oxide is in the range of from 0 to 3 percent by weight and $Al_2O_3$ is 0 percent, having a better stability against devitrification.

In the above described ranges, those glass compositions in which the content of $B_2O_3$ is in the range of from 6 to 17 wt. %, ZnO is 0 to 2 wt. % and alkaline earth metal oxide is also 0 to 2 wt. %, show a higher refractive index and can be worked up into a lens having better performance.

The following composition gives glasses which are good in stability against devitrification:

| | |
|---|---|
| $B_2O_3$ | 8–13 (wt %) |
| $La_2O_3$ | 40–50 |
| $ZrO_2$ | 3–6 |
| $Ta_2O_5$ | 11–23 |
| $WO_3$ | 12–22 |
| $SiO_2$ | 4–7 |
| ZnO | 0–1 |
| Alkaline earth metal oxide | 0 |

Glass compositions having a better stability against devitrification are obtained by using the following composition:

| | |
|---|---|
| $B_2O_3$ | 9–12 (wt. %) |
| $La_2O_3$ | 42–47 |
| $ZrO_2$ | 4–6 |
| $Ta_2O_5$ | 15–18 |
| $WO_3$ | 15–18 |
| $SiO_2$ | 4–7 |
| ZnO | 0–1 |

Among the glass compositions according to the invention, the most stable glass composition against devitrification comprises:

| | |
|---|---|
| $B_2O_3$ | 10.52 (wt. %) |
| $La_2O_3$ | 44.87 |
| $ZrO_2$ | 4.66 |
| $Ta_2O_5$ | 16.70 |
| $WO_3$ | 16.90 |
| $SiO_2$ | 5.52 |
| ZnO | 0.83 |

Optical glasses according to the invention may be prepared by any of the known preparing methods. Starting materials of the components defined above may be the corresponding oxides, carbonates or nitrates. These materials are weighed to give the desired ratio of components and mixed together thoroughly. If necessary, a refining agent such as arsenious acid may be added to the mixture. The prepared mixture is heated up to 1300°–1400° C. Then, it is introduced into a platinuum pot in an electric furnace to melt. After refining, the molten mass is stirred and homogenized, and is cast into an iron die. Thus, an optical glass is obtained after annealing.

A number of embodiments of optical glass compositions according to the invention are shown in the following Table 1 showing their compositions (percent by weight), refractive indexes (nd) and Abbe numbers ($\nu d$).

TABLE 1

| | 1 | 2 | 3 | 4 | 5 | 6 | 7 | 8 |
|---|---|---|---|---|---|---|---|---|
| $B_2O_3$ | 20.46 | 16.96 | 16.96 | 11.96 | 16.96 | 16.96 | 16.96 | 8.96 |
| $La_2O_3$ | 44.83 | 44.83 | 44.83 | 44.83 | 49.83 | 30.83 | 44.83 | 44.83 |
| $ZrO_2$ | 1.15 | 4.65 | 4.65 | 4.65 | 4.65 | 4.65 | 8.65 | 4.65 |
| $Ta_2O_5$ | 16.68 | 23.18 | 1.18 | 16.68 | 11.68 | 30.68 | 16.68 | 19.68 |
| $WO_3$ | 16.88 | 10.38 | 32.38 | 21.88 | 16.88 | 16.88 | 12.88 | 21.88 |
| nd | 1.8593 | 1.8981 | 1.8807 | 1.9258 | 1.8995 | 1.8985 | 1.8930 | 1.9620 |
| $\nu d$ | 37.5 | 36.7 | 35.5 | 34.0 | 36.7 | 32.9 | 36.7 | 32.3 |

| | 9 | 10 | 11 | 12 | 13 | 14 | 15 | 16 |
|---|---|---|---|---|---|---|---|---|
| $B_2O_3$ | 11.96 | 15.50 | 6.96 | 15.76 | 12.96 | 12.96 | 9.56 | 10.50 |
| $La_2O_3$ | 27.83 | 44.83 | 44.83 | 44.83 | 40.33 | 49.83 | 44.83 | 44.83 |
| $ZrO_2$ | 4.65 | 4.65 | 4.65 | 1.85 | 4.65 | 4.65 | 3.25 | 4.65 |
| $Ta_2O_5$ | 21.18 | 32.54 | 23.18 | 17.98 | 21.18 | 11.68 | 18.48 | 22.54 |
| $WO_3$ | 34.38 | 12.48 | 10.38 | 15.58 | 16.88 | 16.88 | 19.88 | 12.48 |
| $SiO_2$ | | | 10.00 | 4.00 | 4.00 | 4.00 | 4.00 | 5.00 |
| nd | 1.9338 | 1.9098 | 1.8989 | 1.8672 | 1.8990 | 1.8955 | 1.9209 | 1.9097 |
| $\nu d$ | 30.3 | 35.9 | 36.3 | 37.3 | 34.8 | 36.6 | 34.4 | 35.9 |

| | 17 | 18 | 19 | 20 | 21 | 22 | 23 | 24 |
|---|---|---|---|---|---|---|---|---|
| $B_2O_3$ | 10.96 | 16.96 | 12.16 | 10.52 | 14.36 | 14.42 | 13.62 | 16.96 |
| $La_2O_3$ | 49.83 | 41.83 | 43.63 | 44.87 | 44.21 | 44.42 | 45.52 | 40.83 |
| $ZrO_2$ | 4.65 | 4.65 | 4.65 | 4.66 | 4.68 | 3.36 | 3.44 | 4.65 |
| $Ta_2O_5$ | 11.68 | 16.68 | 18.48 | 16.70 | 16.79 | 16.86 | 12.35 | 12.68 |
| $WO_3$ | 16.88 | 16.88 | 19.88 | 16.90 | 16.36 | 16.43 | 19.44 | 16.88 |
| $SiO_2$ | 6.00 | | | 5.52 | 2.28 | 2.29 | 3.36 | |
| ZnO | | 3.00 | 1.20 | 0.83 | 1.32 | 2.22 | 2.27 | |
| MgO | | | | | | | | 1.00 |
| CaO | | | | | | | | 2.00 |
| SrO | | | | | | | | 2.00 |
| BaO | | | | | | | | 3.00 |
| nd | 1.8920 | 1.8910 | 1.9336 | 1.9041 | 1.8968 | 1.8927 | 1.8990 | 1.8679 |
| $\nu d$ | 36.6 | 36.1 | 33.8 | 35.6 | 36.0 | 36.1 | 35.8 | 37.0 |

| | 25 | 26 | 27 | 28 | 29 | 30 | 31 | 32 |
|---|---|---|---|---|---|---|---|---|
| $B_2O_3$ | 10.56 | 13.05 | 10.68 | 16.96 | 16.96 | 16.96 | 16.96 | 16.96 |
| $La_2O_3$ | 44.03 | 46.29 | 44.59 | 39.83 | 34.83 | 36.83 | 34.83 | 40.83 |
| $ZrO_2$ | 4.65 | 4.91 | 4.73 | 4.65 | 4.65 | 4.65 | 4.65 | 4.65 |
| $Ta_2O_5$ | 18.28 | 17.58 | 16.95 | 16.68 | 16.68 | 17.98 | 16.68 | 20.58 |

TABLE 1-continued

| | | | | | | | | |
|---|---|---|---|---|---|---|---|---|
| WO₃ | 20.88 | 11.20 | 15.88 | 16.88 | 16.88 | 15.58 | 16.88 | 12.98 |
| SiO₂ | | 5.81 | 5.60 | | | | | |
| ZnO | | 0.92 | 1.34 | | | | | |
| MgO | 0.20 | | | | | | | |
| CaO | 0.40 | | | | | | | |
| SrO | 0.40 | 0.24 | 0.23 | | | | | |
| BaO | 0.60 | | | | | | | |
| Al₂O₃ | | | | | 5.00 | | | |
| GeO₂ | | | | | | 10.00 | | |
| PbO | | | | | | | 8.00 | |
| TiO₂ | | | | | | | | 10.00 |
| Nb₂O₅ | | | | | | | | 4.00 |
| nd | 1.9432 | 1.8767 | 1.8985 | 1.8621 | 1.8558 | 1.9050 | 1.9466 | 1.9078 |
| νd | 33.0 | 37.7 | 35.8 | 36.6 | 36.9 | 33.6 | 28.6 | 34.5 |

As understood from the foregoing, the present invention enables the manufacture, in industrial scale production, of those high refractive index and low dispersion optical glasses which contains no thorium compounds, which are excellent in chemical durability and which have transmission factors suitable for practical use. The refractive index (nd) is in the range of from 1.85 to 1.97 and the Abbe number is in the range of from 28 to 38.

We claim:

1. A thorium free, high refractive index and low dispersion optical glass composition having a refractive index (nd) in the range of from 1.85 to 1.97 and an Abbe number (νd) in the range of from 28 to 38, said optical glass composition consisting essentially of, in percent by weight,:

| | |
|---|---|
| B₂O₃ | 6–21 |
| La₂O₃ | 27–50 |
| ZrO₂ | 1–9 |
| Ta₂O₅ | 1–31 |
| WO₃ | 10–35 |
| SiO₂ | 0–11 |
| ZnO | 0–3 |
| Alkaline earth metal oxide | 0–9 |
| Al₂O₃ | 0–5 |
| GeO₂ | 0–11 |
| PbO | 0–8 |
| TiO₂ | 0–11 |
| Nb₂O₅ | 0–4 |

2. An optical glass composition according to claim 1, wherein the contents of PbO, TiO₂ and Nb₂O₅ are all 0 percent by weight.

3. An optical glass composition according to claim 2, wherein the sum of the contents of Ta₂O₅ and WO₃ is in the range of from 27 to 57 percent by weight.

4. An optical glass composition according to claim 3, wherein the content of GeO₂ is 0 percent by weight.

5. An optical glass composition according to claim 4, wherein the content of alkaline earth metal oxide is in the range of 0 to 3 percent by weight and Al₂O₃ is 0 percent by weight.

6. An optical glass composition according to claim 5, wherein the content of B₂O₃ is in the range of from 6 to 17 percent by weight and the contents of ZnO and alkaline earth metal oxide are each in the range of from 0 to 2 percent by weight.

7. An optical glass composition according to claim 6, which comprises, in percent by weight,:

| | |
|---|---|
| B₂O₃ | 8–13 |
| La₂O₃ | 40–50 |
| ZrO₂ | 3–6 |
| Ta₂O₅ | 11–23 |
| WO₃ | 12–22 |
| SiO₂ | 4–7 |
| ZnO | 0–1 |
| Alkaline earth metal oxide | 0 |

8. An optical glass composition according to claim 7, which comprises, in percent by weight,:

| | |
|---|---|
| B₂O₃ | 9–12 |
| La₂O₃ | 42–47 |
| ZrO₂ | 4–6 |
| Ta₂O₅ | 15–18 |
| WO₃ | 15–18 |
| SiO₂ | 4–7 |
| ZnO | 0–1 |

9. An optical glass composition according to claim 8, which comprises, in percent by weight,:

| | |
|---|---|
| B₂O₃ | 10.52 |
| La₂O₃ | 44.87 |
| ZrO₂ | 4.66 |
| Ta₂O₅ | 16.70 |
| WO₃ | 16.90 |
| SiO₂ | 5.52 |
| ZnO | 0.83 |

* * * * *